US012559146B2

(12) United States Patent　(10) Patent No.: US 12,559,146 B2
Lundberg　(45) Date of Patent: Feb. 24, 2026

(54) PNEUMATIC COUPLER CONTROL ARRANGEMENT AND METHOD FOR UNCOUPLING A COUPLER

(71) Applicant: DELLNER COUPLERS AB, Falun (SE)

(72) Inventor: Peter Lundberg, Falun (SE)

(73) Assignee: DELLNER COUPLERS AB, Falun (SE)

( * ) Notice: Subject to any disclaimer, the term of this patent is extended or adjusted under 35 U.S.C. 154(b) by 506 days.

(21) Appl. No.: 18/031,288

(22) PCT Filed: Oct. 14, 2021

(86) PCT No.: PCT/SE2021/051011
§ 371 (c)(1),
(2) Date: Apr. 11, 2023

(87) PCT Pub. No.: WO2022/081076
PCT Pub. Date: Apr. 21, 2022

(65) Prior Publication Data
US 2023/0373541 A1　Nov. 23, 2023

(30) Foreign Application Priority Data

Oct. 16, 2020　(SE) .................................... 2051205-9

(51) Int. Cl.
B61G 5/10　(2006.01)
B61G 5/06　(2006.01)
(Continued)

(52) U.S. Cl.
CPC ................. B61G 5/10 (2013.01); B61G 5/06 (2013.01); B61G 5/08 (2013.01); H02G 15/08 (2013.01)

(58) Field of Classification Search
CPC ... B61G 5/06; B61G 5/08; B61G 5/10; B61G 7/14
(Continued)

(56) References Cited

U.S. PATENT DOCUMENTS

2019/0248388 A1　8/2019　Liu et al.

FOREIGN PATENT DOCUMENTS

CH　478013 A　9/1969
CN　101698412 A　4/2010
(Continued)

OTHER PUBLICATIONS

Office Action issued on May 29, 2025 in corresponding Chinese Application No. 202180069994.0.

*Primary Examiner* — S. Joseph Morano
*Assistant Examiner* — Heaven R Buffington
(74) *Attorney, Agent, or Firm* — Dilworth & Barrese, LLP

(57) ABSTRACT

The invention relates to an arrangement and a method, the method comprising—uncoupling a mechanical coupler (M), —activating a first valve (2, 20) in response to the uncoupling of the mechanical coupler (M) by switching the first valve (2, 20) to a first state, —activating a valve unit (3, 30), —connecting an uncoupling control inlet (A) of the valve unit (3, 30) to a first valve unit outlet (34, 305) in response to the activation of the valve unit (3, 30), said uncoupling control inlet (A) being an inlet that is supplied by air from the MRP inlet (11), —deactivating an electrical coupler control device (6)—retracting the electrical coupler (E).

19 Claims, 10 Drawing Sheets

Figures 1, 2:
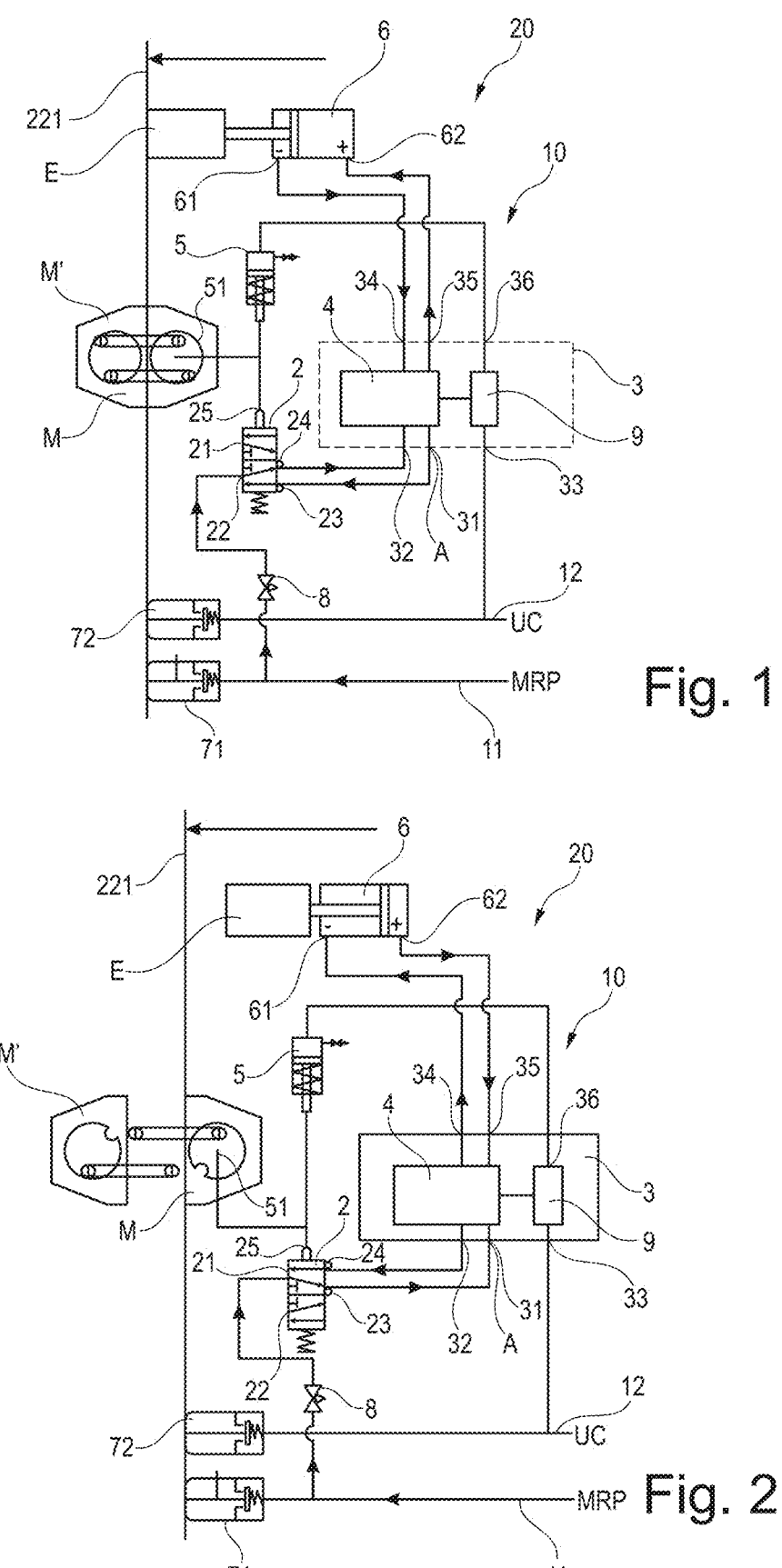

(51) Int. Cl.
　　　*B61G 5/08*　　　　　(2006.01)
　　　*H02G 15/08*　　　　(2006.01)
(58) Field of Classification Search
　　　USPC ..................................................... 213/13, 1.3
　　　See application file for complete search history.

(56) References Cited

FOREIGN PATENT DOCUMENTS

| CN | 201901162 | U | * | 7/2011 |
|----|-----------|---|---|--------|
| CN | 103863352 | A | | 6/2014 |
| CN | 107031680 | A | | 8/2017 |
| EP | 3476688 | A1 | | 5/2019 |
| JP | 7-172316 | A | | 7/1995 |
| KR | 10-2016-0020025 | A | | 2/2016 |

* cited by examiner

Coupler       Car side

——————— Pressurized line

- - - - - - - Non-Pressurized line

Coupler            Car side

——————— Pressurized line

— — — — — Non-Pressurized line

PNEUMATIC COUPLER CONTROL ARRANGEMENT AND METHOD FOR UNCOUPLING A COUPLER

TECHNICAL FIELD

The present invention relates to pneumatic coupler control arrangement and method for uncoupling a coupler. The arrangement forms part of a coupler for railway vehicles and serves to provide coupling and uncoupling of a mechanical coupler and an electrical coupler that form part of the coupler itself.

BACKGROUND

Within the field of railway couplers, a mechanical coupler is used to establish a mechanical connection between a coupler on a first railway vehicle and a similar coupler on a second railway vehicle. An electrical connection is established by coupling electrical couplers of each railway vehicle to each other.

In a coupling sequence, the mechanical connection is established first and is generally an automatic coupling that is initiated by the mechanical couplers coming into contact with each other. A pneumatic coupler control arrangement then serves to provide a coupling of the electrical couplers. In order to protect the electrical couplers from being damaged during coupling, a predetermined delay provided by the pneumatic coupler control arrangement prevents the electrical couplers from being extended towards each other for a short time after the mechanical coupling is completed. This delay is generally in the range of a few seconds.

When uncoupling the couplers, the sequence is reversed so that the electrical couplers are uncoupled and retracted from each other before the mechanical coupling is uncoupled. This also serves the purpose of protecting the electrical couplers. However, there are at present no available pneumatic coupler control systems that are able to provide a satisfactory protection for the electrical coupler both during normal uncoupling and during manual uncoupling in situations where a pneumatic uncoupling command from the railway vehicle cannot be provided. In such situations there is a risk that the uncoupling action itself may damage the electrical coupler and also that the pneumatic system is not able to resume function as intended once the railway vehicle is started again. Most systems require a reboot or a complicated starting sequence in order to ensure that they will be able to operate as intended after a standstill where manual uncoupling has taken place. This is cumbersome and expensive in requiring personnel to perform the reboot and check that functions of the system are operational as intended, and there is still a risk that damage to the electrical coupler due to malfunctions or human error will result in increased requirement of maintenance and repair.

There is therefore a need for a pneumatic coupler control arrangement and a method for uncoupling an electrical coupler that is able to solve these problems.

SUMMARY

The object of the present invention is to eliminate or at least to minimize the problems discussed above. This is achieved by a method and arrangement according to the description herein.

The method according to the invention comprises uncoupling a mechanical coupler in response to an uncoupling command, activating a first valve in response to the uncoupling of the mechanical coupler by switching the first valve to a first state, the first valve comprising a first inlet connected to an MRP inlet that is configured to be connected to a main reservoir pipe of a rail vehicle, wherein the first state of the first valve is a position in which the first inlet is connected to a first outlet so that air is able to flow through the first valve to the first outlet, activating a valve unit by receiving air from the first outlet of the first valve to a first valve unit inlet, connecting an uncoupling control inlet of the valve unit to a first valve unit outlet in response to the activation of the valve unit, said uncoupling control inlet being an inlet that is supplied by air from the MRP inlet, deactivating an electrical coupler control device by receiving air from the first valve unit outlet to an uncoupling inlet of the electrical coupler control device, and retracting the electrical coupler.

Suitably, the method further comprises blocking air supply from the main reservoir pipe of the rail vehicle to the uncoupling control inlet after the electrical coupler is uncoupled.

Also, the first valve may be activated by the uncoupling of the mechanical coupler.

Further, the uncoupling command may be a manual activation of a manual activation device for the mechanical coupler.

Also, the activation of the valve unit may comprise switching a second valve of the valve unit to a first state, said first state being a position in which the uncoupling control inlet is connected to the first valve unit outlet.

In one embodiment, the uncoupling control inlet is the first valve unit inlet.

Suitably, the method may then further comprise receiving air to the valve unit from a second outlet of the first valve, said first valve being in a second state in which the first inlet is connected to the second outlet of the first valve, activating the valve unit by receiving the uncoupling command to a third valve unit inlet, wherein the uncoupling command is a supply of air to a UC inlet, said UC inlet being configured to be connected to an uncoupling pipe of the rail vehicle, wherein activating the valve unit comprises switching the second valve to a second state, said second state being a position in which a second valve unit inlet is connected to the first valve unit outlet, wherein said second valve unit inlet is connected to the second outlet of the first valve and wherein further the first valve unit outlet is connected to the uncoupling inlet of the electrical coupler control device for uncoupling the electrical coupler, providing a delayed uncoupling of the mechanical coupler by the supply of air to the third valve unit inlet being fed to the mechanical coupler after a predetermined delay time, wherein the activation of the valve unit by receiving the uncoupling command and the providing of the delayed uncoupling of the mechanical coupler take place before the uncoupling of the mechanical coupler.

In another embodiment, the uncoupling control inlet is a third valve unit inlet.

Suitably, the uncoupling command may then be a supply of air to a UC inlet, said UC inlet being configured to be connected to an uncoupling pipe of the rail vehicle, and the method may further comprise providing a delayed uncoupling of the mechanical coupler by a supply of air from the UC inlet to a second valve unit inlet being fed to the manual activation device for the mechanical coupler after a predetermined delay time.

Also, the predetermined delay time may be a time until the electrical coupler is in a retracted position.

The invention also relates to a pneumatic coupler control arrangement for controlling an uncoupling of a coupler for a rail vehicle, the coupler having a mechanical coupler and an electrical coupler, the pneumatic coupler control arrangement comprising a mechanical uncoupling device for uncoupling a mechanical coupler, a first valve comprising a first inlet connected to an MRP inlet that is configured to be connected to a main reservoir pipe of a rail vehicle for receiving pressurized air, the first valve further comprising a first outlet and also comprising a trigger for switching the first valve to a first state, wherein the first state is a position in which the first inlet is connected to the first outlet, and wherein further the mechanical uncoupling device is configured to activate the trigger in response to an uncoupling command, a valve unit comprising a first valve unit inlet that is operatively connected to the first outlet of the first valve, wherein the valve unit comprises a first trigger connected to the first valve unit inlet for activating the valve unit to switch a second valve of the valve unit to a first state, wherein the first state is a state in which an uncoupling control inlet is connected to a first valve unit outlet, said uncoupling control inlet being an inlet that is supplied by air from the MRP inlet, an electrical coupler control device that is configured to extend an electrical coupler for coupling and retract the electrical coupler for uncoupling, wherein the electrical coupler control device comprises an uncoupling inlet, said uncoupling inlet being connected to the first valve unit outlet and the electrical coupler control device further being configured to uncouple an electrical coupler in response to receiving pressurized air to the uncoupling inlet.

Suitably, the arrangement further comprises an air shutting device that is configured to block a supply of pressurized air to the uncoupling control inlet.

Also, the mechanical coupler uncoupling device may be configured to activate the trigger of the first valve in connection with the uncoupling of the mechanical coupler.

Further, the arrangement may comprise a manual activation device for activating the mechanical coupler uncoupling device.

In one embodiment, the coupler control inlet is the first valve unit inlet.

Suitably, the first valve is then a two-position five-way mechanical control valve.

Also, the arrangement may further include that the first valve comprises a second outlet, wherein the first inlet is connected to the second outlet in a second state of the first valve, and the second outlet further being connected to a second valve unit inlet, the valve unit comprises a third valve unit inlet connected to a UC inlet that is configured to be connected to an uncoupling pipe of the rail vehicle for receiving pressurized air, and the valve unit comprises a second trigger that is connected to the third valve unit inlet for switching the second valve to a second state, said second state being a state in which the second valve unit inlet is connected to the first valve unit outlet, the valve unit further comprises a delay device having a delay device inlet that is connected to the third valve unit inlet and also comprising a delay device outlet that is connected to the mechanical uncoupling device for uncoupling the mechanical coupler, the delay device being configured to connect the delay device inlet to the delay device outlet with a predetermined delay.

Also, the delay device may suitably comprise an air container and/or a flow regulator valve.

In another embodiment, the coupler control inlet is a third valve unit inlet.

Suitably, the valve unit then comprises a delay device having a delay device inlet that is connected to the second valve unit inlet and also comprising a delay device outlet that is connected to the mechanical uncoupling device for uncoupling the mechanical coupler, the delay device being configured to connect the delay device inlet to the delay device outlet with a predetermined delay, said connecting of the delay device inlet to the delay device outlet being triggered by the electrical coupler reaching a retracted position.

The present invention also relates to a coupler comprising a coupler control arrangement according to the invention.

Many additional benefits and advantages of the present invention will be readily understood by the skilled person in view of the detailed description below.

DRAWINGS

Figure 3:
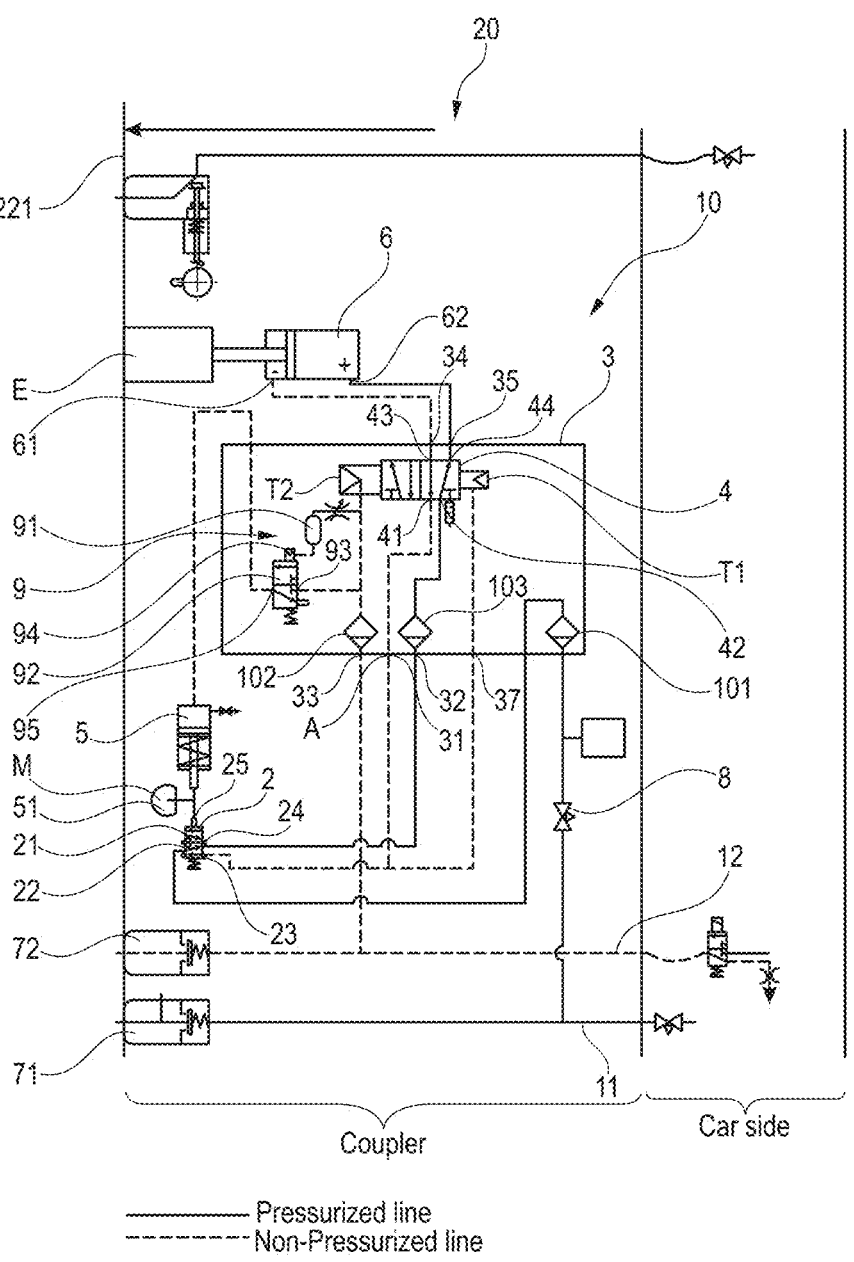
Figure 4:
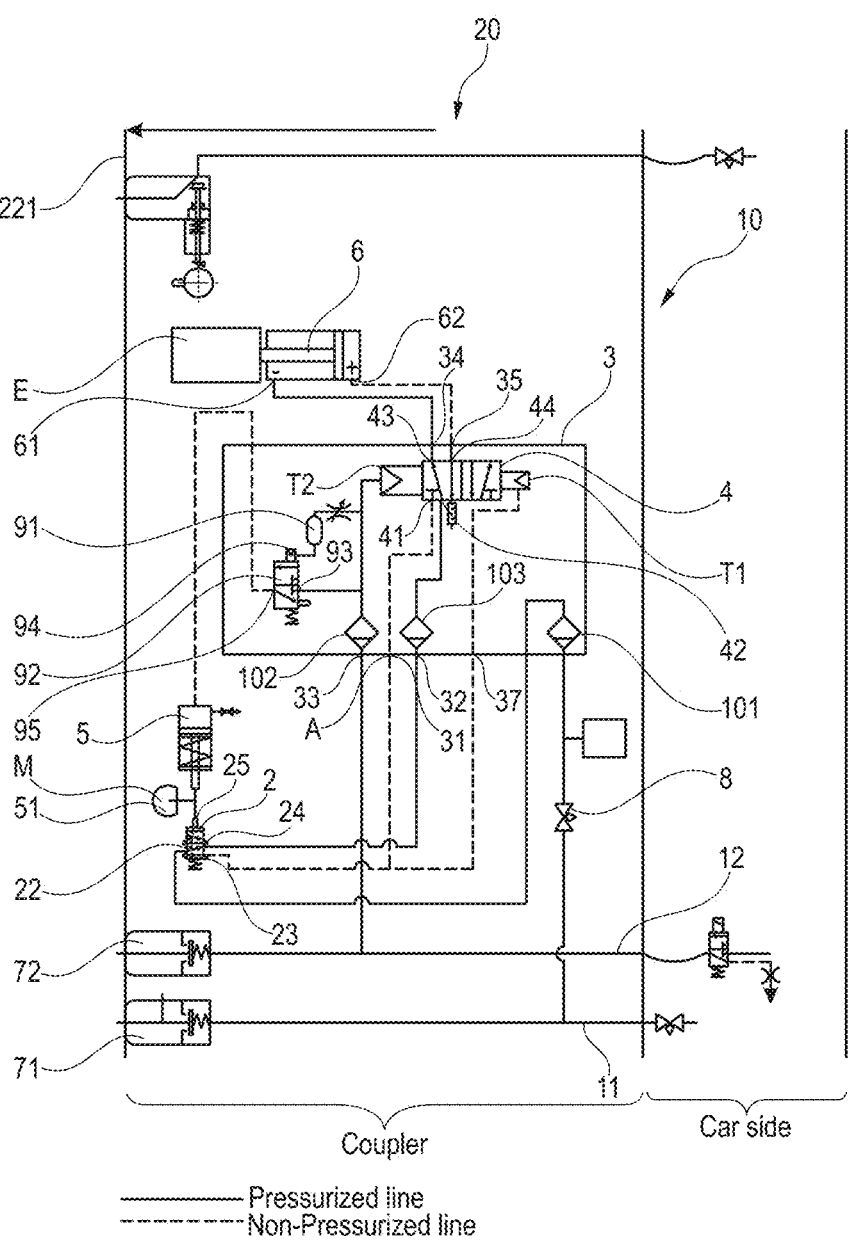
Figure 5:
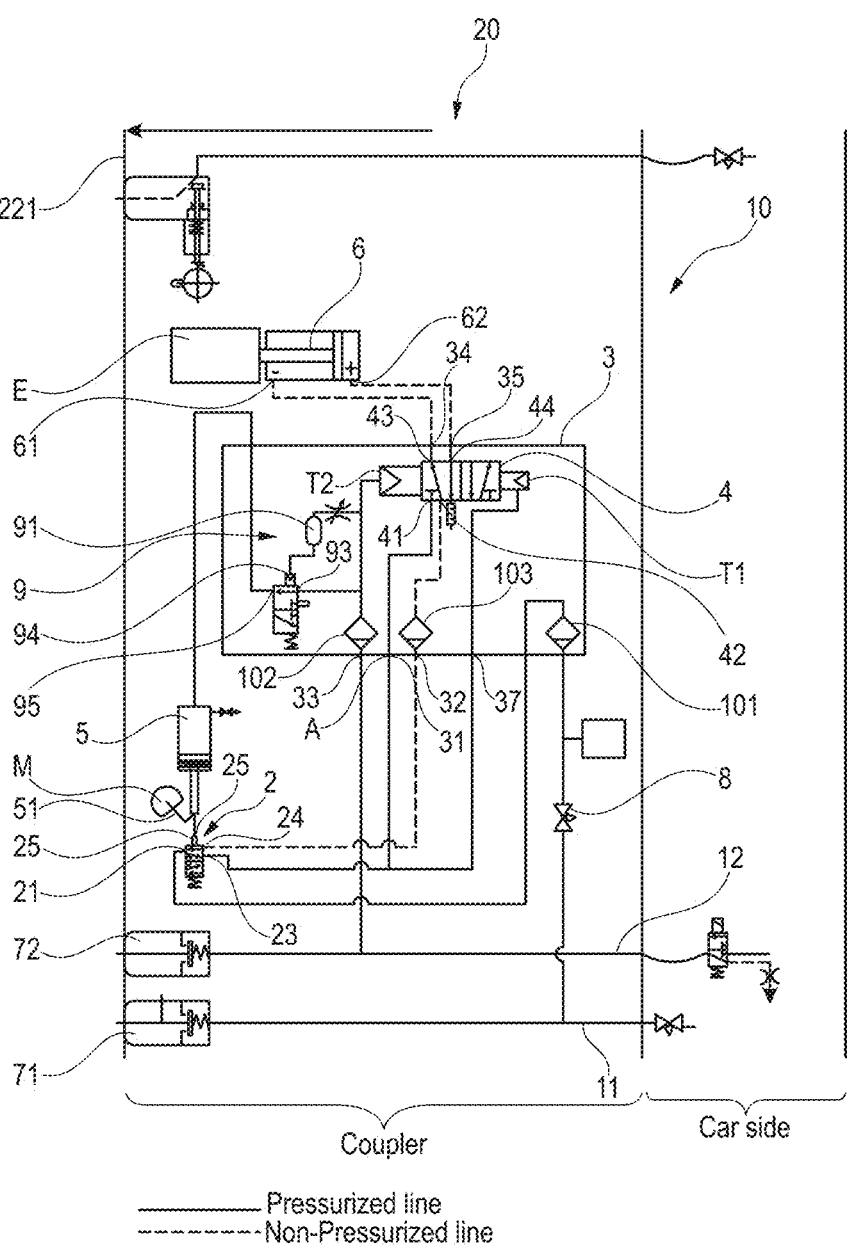
Figure 6:
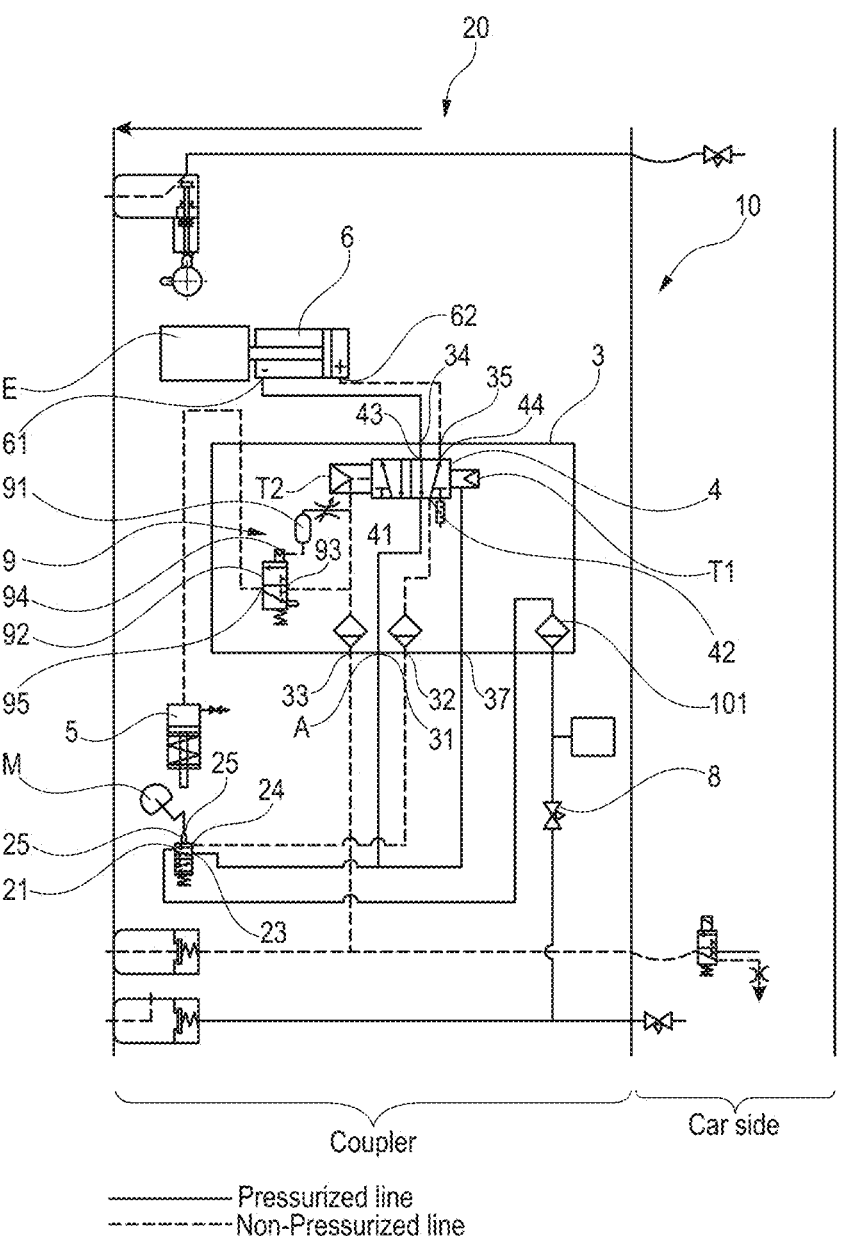
Figures 7, 8:
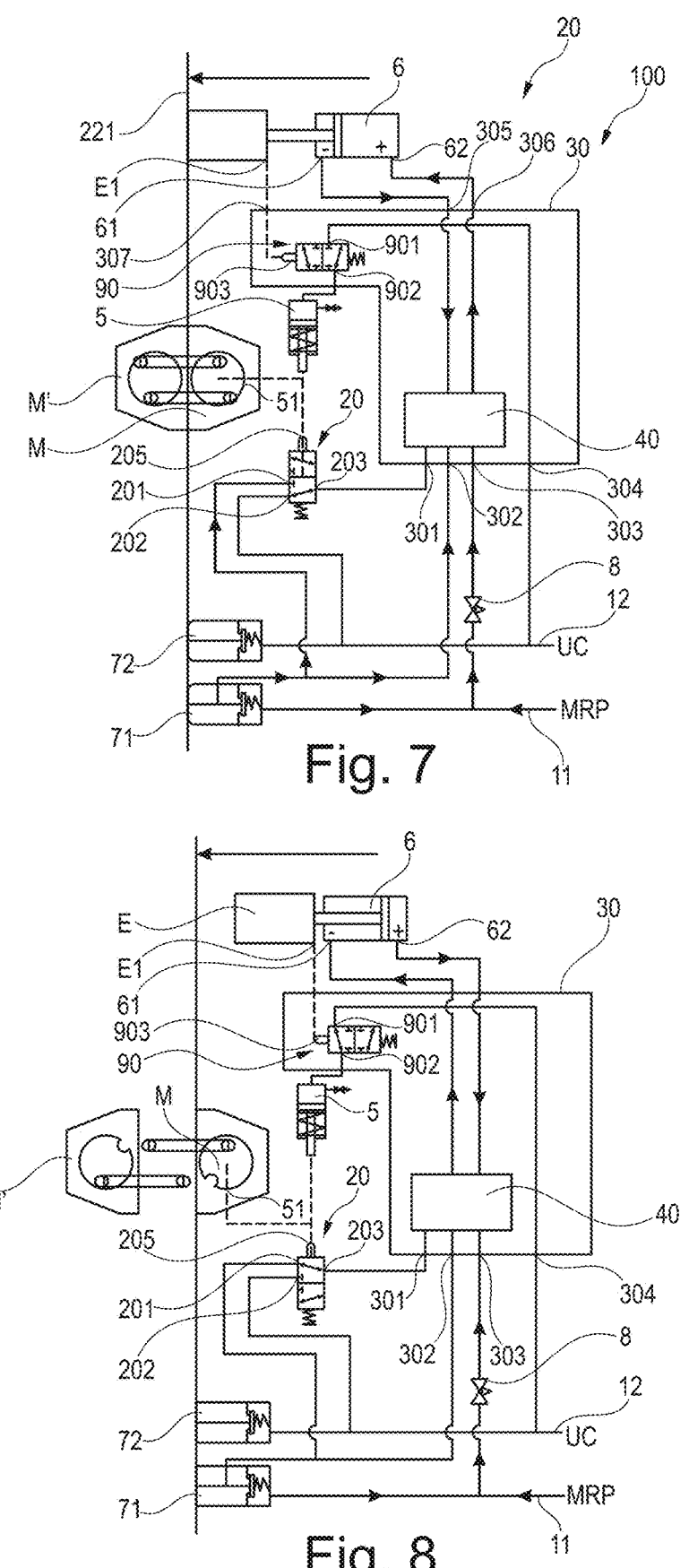
Figure 9:
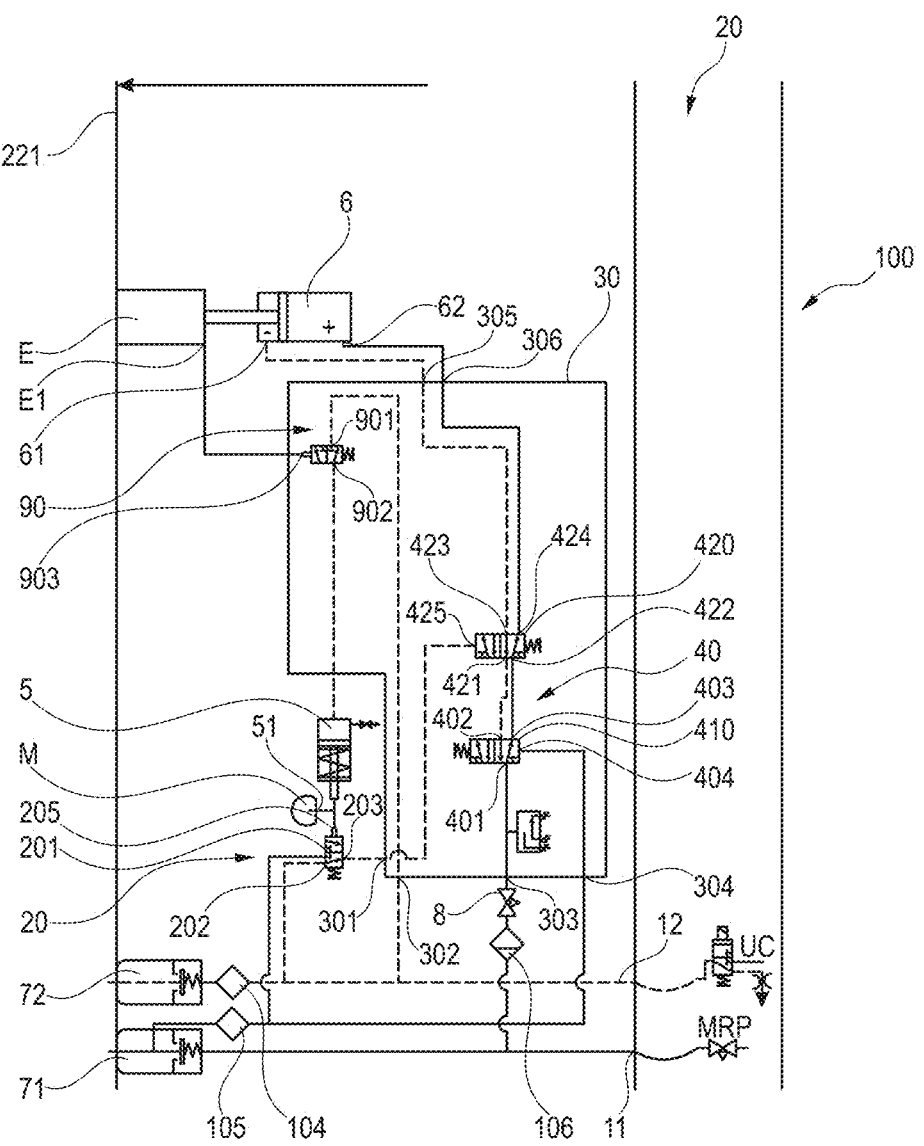
Figure 10:
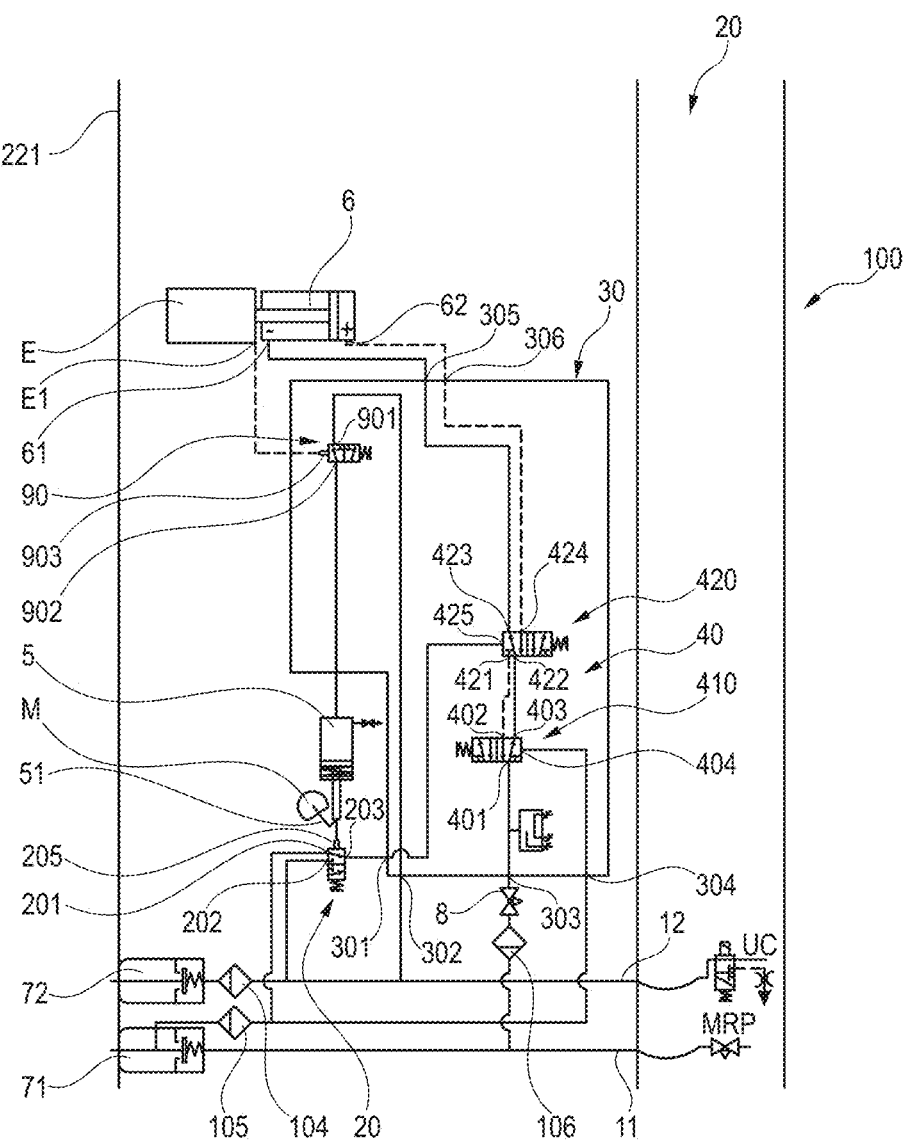
Figure 11:
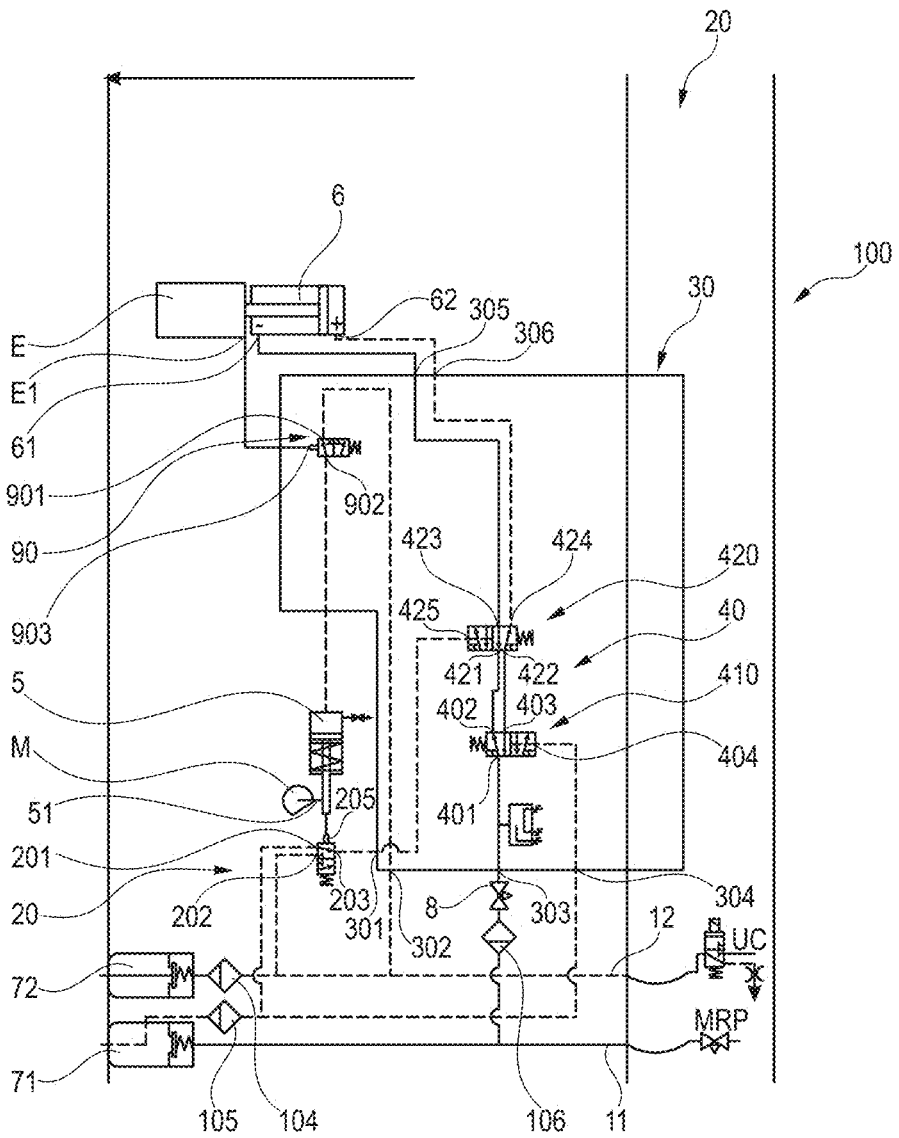
Figure 12:
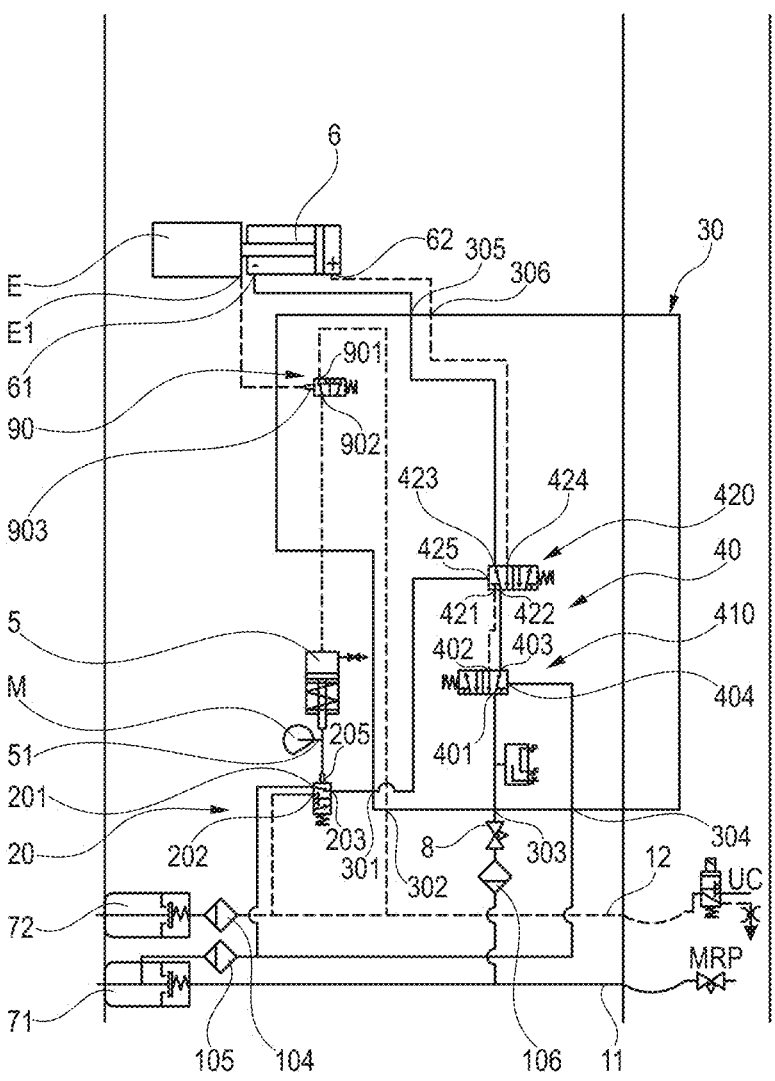

The invention will now be described in more detail with reference to the appended drawings, wherein FIG. 1 discloses schematically a first embodiment of the invention in a coupled state;

FIG. 2 discloses schematically the first embodiment in an uncoupled state;

FIG. 3 discloses a pneumatic diagram of the first embodiment in the coupled state;

FIG. 4 discloses a pneumatic diagram of the first embodiment in a state where the electrical coupler is uncoupled but the mechanical coupler is coupled;

FIG. 5 discloses a pneumatic diagram of the first embodiment in the uncoupled state where the uncoupling sequence has been finished;

FIG. 6 discloses a pneumatic diagram of the first embodiment in the uncoupled state;

FIG. 7 discloses schematically a second embodiment of the invention in a coupled state;

FIG. 8 discloses schematically the second embodiment in an uncoupled state;

FIG. 9 discloses a pneumatic diagram of the second embodiment in the coupled state;

FIG. 10 discloses a pneumatic diagram of the second embodiment in a state where the electrical coupler is uncoupled and the mechanical coupler is uncoupled;

FIG. 11 discloses a pneumatic diagram of the second embodiment in the uncoupled state; and FIG. 12 discloses a pneumatic diagram of the second embodiment in a manual uncoupling sequence.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

The present invention is realized in two main embodiments that each achieves the technical effect of uncoupling an electrical coupler in a reliable and efficient way while avoiding the risk of damage due to unintended extension of the electrical coupler after uncoupling or due to damage to the electrical coupler if uncoupling takes place under draft load. Each of the first and second embodiment are able to achieve an uncoupling using a manual uncoupling command (generally in the form of manually activating an uncoupling device) and using an uncoupling demand from a rail vehicle on which the coupler is mounted. In the following, the first embodiment and the second embodiment are described in turn and it is to be noted that features from the first embodiment may be combined with features from the second embodiment and vice versa unless such combination is expressly described as unsuitable.

A main difference between the first and second embodiment is the configuration and operation of a valve unit that is configured to be activated in response to an uncoupling command so that air is propagated from an uncoupling control inlet through the valve unit to a first valve unit outlet. However, in other respects the embodiments are similar and they are both able to achieve the main benefits of the invention, as will be described in more detail below.

The present invention relates to a pneumatic arrangement where pressurized air is provided in order to control operation of the arrangement. Where there are references to "air" in the following, such as "receiving air", "propagating air" or "allowing an airflow", this it to be understood as referring to pressurized air provided in the pneumatic arrangement.

In the following, when describing valves and their operation the connecting of an inlet to an outlet is to be understood as the valve being in a position that comprises a flow path from the inlet to the outlet through the valve. An inlet is a term used for a port of the valve that is configured to receive air, whereas an outlet is a term used for a port that is configured to emit air.

In the drawings, the schematic presented by FIG. 1-2 and FIG. 7-8 disclose pressurized lines as lines with arrows that show the flow of air whereas non-pressurized lines are disclosed without arrows. In the pneumatic diagrams of FIG. 3-6 and FIG. 9-12, pressurized lines are shown as lines and non-pressurized lines are shown as dashed lines.

The present invention relates to a pneumatic coupler control arrangement and method for uncoupling an electrical coupler that uses components of a pneumatic coupler control arrangement. In operation, this arrangement is mounted in a railway coupler that is in turn mounted on a railway vehicle such as a train car. In the following, structure and function of the pneumatic coupler control arrangement is described with reference to the coupler and the railway vehicle but it is to be noted that the railway vehicle and the coupler as such are not integral parts of the pneumatic coupler control arrangement.

When the term "connected" is used herein to describe a relationship between components, this is to be understood as operatively connected such that the components are able to function together or to propagate a medium from one component to the other. For instance, stating that a valve is connected to an inlet or a conduit for propagating pressurized air is to be understood as the valve being configured to be connected to said inlet or conduit in such a way that air is able to flow from one to the other.

The present invention is especially beneficial when used with a two position coupler, i.e. a coupler where the mechanical coupler once uncoupled remains in its uncoupled position until coupling again. However, the invention may also be used with other couplers such as a one position coupler where the mechanical coupler after uncoupling returns to the same position as when in the coupled state.

FIG. 1 discloses a schematic view of the first embodiment of a pneumatic coupler control arrangement 10 of the present invention in a coupled state. At a front face 21 of a coupler 200, a mechanical coupler M is provided and coupled to a similar mechanical coupler M' of another coupler (not shown). Also, an electrical coupler E is shown in an extended state where it is able to couple to a similar electrical coupler of another coupler (not shown). Uncoupling of the mechanical coupler M is controlled by a mechanical uncoupling device 5 that may suitably be an uncoupling cylinder as is well known in the art. Extension and retraction of the electrical coupler E is controlled by an electrical coupler control device 6 that may suitably be an actuator that operates by extending the electrical coupler E in response to an activation caused by receiving air to a coupling inlet 62 and retracting the electrical coupler E in response to receiving air to an uncoupling inlet 61. In order to retract the electrical coupler E, an air supply to the uncoupling inlet 61 serves to deactivate the electrical coupler control device 6.

The pneumatic coupler control arrangement 10 comprises an MRP inlet 11 that is configured to be connected to a main reservoir pipe of the rail vehicle such that pressurized air from the main reservoir pipe may flow into the MRP inlet 11 when the pneumatic coupler control arrangement 10 and the coupler on which it is mounted are connected to the railway vehicle. Also, the pneumatic coupler control arrangement 10 comprises a UC inlet 12 that is configured to be connected to an uncoupling pipe of the rail vehicle. The uncoupling pipe serves to supply pressurized air in response to an uncoupling command issued from the railway vehicle and through the connection of the uncoupling pipe to the UC inlet 12, said pressurized air is able to flow into the UC inlet 12 when the uncoupling command is given in this way.

The MRP inlet is connected to an MRP valve 71 and the UC inlet 12 is connected to a UC valve 72 such as is well known within the art. The MRP inlet is further connected to a first valve 2 that is suitably a two-position five-way mechanical control valve. The first valve 2 comprises a first inlet 21, and also comprises a first outlet 23 and a second outlet 24, as well as a trigger 25 that when activated switches the valve from a second state to a first state. FIG. 1 shows the first valve 2 in the second state, and this is a state in which the first valve 2 is in a position that connects the first inlet 21 to the second outlet 24. The MRP inlet is connected or connectable to the first inlet 21. The first valve 2 is suitably provided with a spring for urging the first valve 2 towards the second state.

Also provided is a valve unit 3 that comprises at least a second valve 4 and a delay device 9. The valve unit 3 comprises a first valve unit inlet 31 that is connected to the first outlet 23 of the first valve 2. The valve unit 3 also comprises a second valve unit inlet 32 that is connected to the second outlet 24 of the first valve 2. Also, the valve unit 3 comprises a third valve unit inlet 33 that is connected to the UC inlet 12. In the first embodiment, the first valve unit inlet 31 serves as an uncoupling control inlet A.

Furthermore, the valve unit 3 comprises a first valve unit outlet 34 that is connected to the uncoupling inlet 61 of the electrical coupler control device 6 and a second valve unit outlet 35 that is connected to the coupling inlet 62 of the electrical coupler control device 6. Also, the valve unit 3 comprises a delay outlet 36 that is connected to the mechanical uncoupling device 5.

The mechanical uncoupling device 5 is in turn connected to the mechanical coupler M in order to control its uncoupling, and the mechanical uncoupling device 5 and/or the mechanical coupler M are/is connected to the trigger 25 of the first valve 2 such that it is able to switch the first valve 2 from the second state to the first state. In this embodiment the connection is a mechanical connection but in other embodiments the connections between the mechanical uncoupling device 5 and the mechanical coupler M and the trigger may alternatively in other form such as electric or pneumatic.

The pneumatic coupler control arrangement 10 further comprises an air shutting device 8, suitably a ball valve 8 that is arranged between the MRP inlet 11 and the first valve 2 such that the ball valve 8 is able to control a flow of air to the first valve 2. The air shutting device 8 also serves to ventilate air in the electrical coupler control device 6 when shut off.

FIG. 1 discloses the pneumatic coupler control arrangement 10 in the coupled state, and in FIG. 2 the uncoupled state of the same pneumatic coupler control arrangement 10 is shown. FIG. 2 thus comprises the same components as FIG. 1, but the mechanical coupler M is uncoupled from the similar coupler M' and the electrical coupler E is retracted to a retracted position Also, the first valve 2 is in the first state, and this is a position or state in which the first inlet 21 is connected to the first outlet 23 so that pressurized air propagates from the MRP inlet through the first valve and reaches the first valve unit inlet 31 of the valve unit 3.

Operation of the first embodiment will now be described with reference to FIG. 1-2. A more detailed operation of the first embodiment will also be described below with reference to FIG. 3-4.

Thus, in FIG. 1 the coupled state is shown with arrows disclosing the propagation of air in conduits that connect the components to each other. In the coupled state, air is provided to the MRP inlet 11 and passes the air shutting device 8 and through the first valve 2 by passing into the first inlet 21 and out from the second outlet 24 to reach the second valve unit inlet 32 of the valve unit 3. Operation of the valve unit 3 will be described in detail further below, suffice it to say at a simplified stage that air is propagated from the second valve unit inlet 32 to the second valve unit outlet 35 and onwards to the coupling inlet 62 so that the electrical coupler control device 6 maintains the electrical coupler E in the extended and coupled position shown in FIG. 1.

An uncoupling command can be generated by activating the uncoupling line from the railway vehicle so that pressurized air reaches the UC inlet 12, or alternatively by a human operator generating a manual uncoupling command. The uncoupling initiated by the manual uncoupling command will now be described.

A manually initiated uncoupling may generally take place in situations when the railway vehicle is not in operation so that the uncoupling line is not operational. Other situations where manual uncoupling is used include emergencies and situations when the railway vehicle fails to provide the uncoupling command due to malfunction. In such events, the manual uncoupling command may be generated by the human operator using a manual activation device 51 that is suitably provided in connection with the mechanical coupler M. The manual activation device may be a handle that is turned so that a rotation of the mechanical coupler M is initiated in order to release the mechanical coupler M. Alternatively, the manual activation device may be a wire linked to a hook plate of the mechanical coupler M so that pulling on the wire activates the uncoupling.

When the mechanical coupler is uncoupled, the trigger 25 of the first valve 2 is activated so that the first valve is switched to the first state in which the first inlet 21 is connected to the first outlet 23. This allows air to propagate from the MRP inlet 11 through the first valve and onwards to the first valve unit inlet 31 of the valve unit 3.

The valve unit 3 is configured to connect the coupler control inlet A, i.e. the first valve unit inlet 31 to the first valve unit outlet 34 so that air is allowed to propagate through the valve unit 3 to the uncoupling inlet 61 of the electrical coupler control device 6. This results in the retraction of the electrical coupler E so that the coupler 200 is uncoupled from the similar coupler.

The air shutting device 8, suitably a ball valve 8, may be used in maintenance situations or when coupling with a coupler lacking an electrical coupler or having a different electrical coupler to the one on the coupler 200. Using the air shutting device 8 in such situations serves to prevent air supply to the electrical coupler control device 6 in order to prevent an undesired extending of the electrical coupler E and thereby protect the electrical coupler E from damage.

If the uncoupling command is generated by the uncoupling pipe of the railway vehicle being used so that pressurized air enters the UC inlet 12, air is passed to the third valve unit inlet 33. The first valve 2 is at this time in a second state in which the first inlet 21 is connected to the second outlet 24 and the valve unit 3 is configured to allow air to pass from the second valve unit inlet 32 to the second valve unit outlet 35 that is connected to the coupling inlet 62 of the electrical coupler control device 6 so that the electrical coupler is extended. Once the uncoupling command is received by the valve unit 3, however, operation of the valve unit 3 is altered by activating the valve unit 3 so that air from the second valve unit inlet 32 is propagated to the first valve unit outlet 34 and onwards to the uncoupling inlet 61 of the electrical coupler control device 6. Also, the delay device 9 is activated so that air is emitted through the delay outlet 36 after the predetermined delay time and activates the mechanical uncoupling device 5 for uncoupling the mechanical coupler M. This in turn triggers the first valve 2 and switches the valve to the first state where air propagates from the first inlet 21 to the first inlet 23, and the same sequence as described above with reference to the manually initiated uncoupling command now takes place. This ensures that the electrical coupler E is retracted and held in the retracted position until the mechanical coupler M is again coupled to another coupler.

Also, the delay device 9 is activated, suitably by an air supply to the third valve unit inlet 33, and the delay device 9 then provides air in the delay outlet 36 after a predetermined delay time. Suitably, the delay device 9 comprises an air container that takes the predetermined delay time to fill with air but alternatively the delay device 9 could be an air flow regulator valve or another suitable device such as that described below with reference to the second embodiment. In the first embodiment, the delay device 9 comprises both an air flow regulator valve and an air container and this is advantageous in providing a high degree of control over the operation of the delay device 9.

One important advantage of the present invention as compared with the prior art is that the uncoupling of the electrical coupler E is achieved by air that is supplied from the MRP inlet 11. The uncoupling command then serves to trigger the first valve 2 which in turn operates the valve unit 3 as will be described in more detail below, resulting in the retraction of the electrical coupler E. Since the present invention uses the air received from the main reservoir pipe that is available also when the railway vehicle is not operational, uncoupling and a maintained retraction of the electrical coupler is possible regardless of the operational status of the railway vehicle. This significantly lowers the risk of damage due to undesired or unintentional extension of the electrical coupler E.

The present invention provides an uncoupling sequence where the electrical coupler E is uncoupled in response to the uncoupling command from the railway vehicle while still maintaining the coupling of the mechanical coupler M, and after a delay time during which the electrical coupler E is safely brought into the retracted position, the mechanical coupler M is then uncoupled also. In a manual uncoupling, the sequence involves uncoupling both the mechanical coupler M and the electrical coupler E at approximately the same time.

When proceeding from the uncoupled state of FIG. 2 to the coupled state of FIG. 1, operation of the pneumatic coupler control arrangement 10 is initiated by the mechanical coupler M coupling automatically with the similar mechanical coupler M' of another coupler. This triggers the trigger 25 of the first valve 2 so that the first valve 2 is switched from the first state of FIG. 2 to the second state of FIG. 1 and thereby allows air to flow from the first inlet 21 to the second outlet 24 and into the second inlet 32 of the valve unit 3 where it is propagated to the second valve unit outlet 35 and on to the coupling inlet 62 of the electrical coupler control device 6 so that the electrical coupler E is extended and allowed to couple with a similar electrical coupler of the other coupler.

A coupling sequence for the present invention is thus that a mechanical coupling takes place first, followed by an electrical coupling after a delay time has passed.

By using the air shutting device 8 that may be in the form of a ball valve 8 as described above, extension of the electrical coupler E may be prevented in situations where the mechanical coupler M has been coupled to another coupler that lacks the electrical coupler or that has an electrical coupler of a different design. In such situations, it is important to prevent the extension of the electrical coupler E in order to protect the electrical coupler E and avoid damage. Instead of a ball valve, the air shutting device may alternatively be any other valve or flow interruption device that is able to interrupt and prevent an airflow in a conduit.

The first embodiment will now be described with reference to the more detailed FIG. 3-6 that show operation of the valve unit 3. Components that are shown in FIG. 1-2 will not be introduced again, rather only those features that are not individually identified or that are shown in more detail in FIG. 3-6 will now be elucidated. Pressurized lines are shown as lines and non-pressurized lines are shown as dashed lines throughout.

FIG. 3 discloses the coupled state, and the mechanical coupler M is now shown schematically in the form of a main shaft of the mechanical coupler M that is rotated in order to uncouple the mechanical coupler.

The valve unit 3 comprises a second valve 4 having a first inlet 41 that is connected to the first valve unit inlet 31 and a second inlet 42 that is connected to the second valve unit inlet 32. The second valve 4 also comprises a first outlet 43 that is connected to the first valve unit outlet 34 and a second outlet 44 that is connected to the second valve unit outlet 35. Furthermore, the second valve 4 comprises a first trigger T1 that is connected to a fourth valve unit inlet 37 that may be a separate inlet but that may alternatively be included in the first valve unit inlet 31 such that a connection inside the valve unit 3 may branch off to guide air from the first valve unit inlet 31 both to the first inlet 41 of the second valve 4 and to the first trigger T1. If the fourth valve unit inlet 37 is provided separately, it is connected to the first outlet 23 of the first valve 2. The second valve 4 further comprises a second trigger T2 that is connected to the third valve unit inlet 33. In the first embodiment, the second valve 4 is suitably a five-way two positional control valve. As also shown in FIG. 3, the third valve unit inlet 33 is connected to the delay device 9 that is shown as an air container 91, a flow regulator valve 97 and a mechanical uncoupling valve 92 that has an inlet 93 connected to the third valve unit inlet 33 and an outlet 95 connected to the mechanical uncoupling device 5. The mechanical uncoupling valve 92 further comprises a trigger 94 that is connected to the air container 91 such that a filling of the air container 91 triggers the trigger 94 and switches the mechanical uncoupling valve 92 to a state in which the inlet 93 is connected to the outlet 95 so that air is able to pass through the valve and onwards to the mechanical uncoupling device 5.

Also shown in FIG. 3 are filters 101, 102, 103 that may be provided to continuously clean the air in the pneumatic coupler control arrangement 10, and it is to be noted that the filters 101, 102, 103 are optional and may be placed differently to the configuration shown in the Figures. It is advantageous to provide filters to ensure clean air in the system but it is not necessary for the operation of the pneumatic coupler control arrangement 10.

The invention also includes a coupler for a railway vehicle, wherein the coupler comprises a pneumatic coupler control arrangement according to the invention. The coupler will not be described in detail herein but it is to be understood that any suitable coupler having both a mechanical and an electrical coupler are suitable for comprising the pneumatic coupler control arrangement according to the present invention.

Operation of the first embodiment for uncoupling the electrical coupler E will now be described in more detail with focus on the detailed operation of the valve unit 3.

In the coupled state shown in FIG. 3, the first valve 2 is in the second state as described above and the second valve 4 is in a third state in which the second inlet 42 is connected to the second outlet 44 that is in turn connected to the second valve unit outlet 35 so that air is propagated to the coupling inlet 62 of the electrical coupler control device 6.

As described above, the uncoupling may be initiated by the uncoupling command in the form of a received uncoupling command from the railway vehicle that provides air to the uncoupling inlet 12. This provides pressurized air to the third valve unit inlet 33 such that the second trigger T2 is activated and so that the inlet 93 to the mechanical uncoupling valve 92 is pressurized and the air container 91 starts to fill. The activation of the second trigger T2 causes the shifting of the second valve 4 into a second state in which the second inlet 42 is connected to the first outlet 43 and onwards to the first valve unit outlet 34 that is connected to the uncoupling inlet 61 of the electrical coupler control device 6. This causes the retraction of the electrical coupler E so that the pneumatic coupler control arrangement 10 reaches the state shown in FIG. 4 where the electrical coupler E is retracted but the mechanical coupler M is still coupled due to the delay provided by the delay device 9.

Starting now from FIG. 4, the air container 91 of the delay device 9 rills so that the trigger 94 of the mechanical uncoupling valve 92 is activated and connects the inlet 93 to the outlet 95 so that air is supplied to the mechanical uncoupling device 5 and triggers the trigger 25 of the first valve 2. This state is shown in FIG. 5 where the second outlet 24 of the first valve 2 is not pressurized but where the second valve 4 has not yet shifted to the first state, and in this position none of the first and second valve unit outlets 34, 35 are pressurized so that no retraction or extension command is given to the electrical coupler control device 6.

Next, the supply of air to the mechanical uncoupling device 5 causes mechanical uncoupling and activation of the trigger 25 of the first valve 2 so that the first valve 2 is switched to the first state and the first inlet 21 is connected to the first outlet 23, allowing air to flow to the first valve unit inlet 31 and to the fourth valve unit inlet 37 that may optionally be integrated with the first valve unit inlet 31 as mentioned above.

From the fourth valve unit inlet 37, air is supplied to the first trigger T1 and triggers the second valve 4 to switch to the first state in which the first inlet 41 that receives air from the first valve unit inlet 31 is connected to the first outlet 43 that is in turn connected to the first valve unit outlet 34 so that air may continue to be supplied to the uncoupling inlet 61 of the electrical coupler control device 6 and ensure that the electrical coupler E remains retracted. Thereby, the uncoupled state of FIG. 6 is reached where both the electrical coupler E and the mechanical coupler M are uncoupled.

If a manual uncoupling command is instead used as described above, this activates the trigger 25 as the mechanical coupler M is uncoupled. The first valve 2 thus being brought into the first state will then supply air to the first valve unit inlet 31 and to the fourth valve unit inlet 37 so that the second valve 4 is triggered by the first trigger T1 and brought into the first state in which the first inlet 31 is connected to the first outlet 43 in order for air to be supplied to the uncoupling inlet 61 of the electrical coupling control device 6. When initiated manually, no pressurized air is provided in the UC inlet 12, but due to the supply of air from the MRP inlet 11 and the triggering of the first valve, the uncoupling of the electrical coupler may still take place as desired and the electrical coupler will also be securely held in the retracted position until the mechanical coupler is again coupled, regardless of whether the railway vehicle is operational or not.

The second embodiment will now be described with reference to the schematic FIG. 7-8.

The main difference between the first and second embodiment is an internal configuration and operation of the valve unit 3, 30, but they share the main feature of activation of the first valve 2, 20 causing air to flow into the valve unit 3, 30 through an uncoupling control inlet A that is connected to the first valve unit outlet 34 so that pressurized air is supplied to the uncoupling inlet 61 of the electrical coupler control device 6. In the first embodiment described above the first valve unit inlet 31 serves as the uncoupling control inlet A, and in the second embodiment described above this function is instead performed by a third valve unit inlet 303.

In FIG. 7, the coupler 200 with the pneumatic coupler control arrangement 100 of the second embodiment is shown with the mechanical coupler M in a coupled state to a similar coupler M' and the electrical coupler E is extended to the front face 21 of the coupler in order to be able to couple with a similar electrical coupler (not shown). For the electrical coupler E, the electrical coupler control device 6 is provided and has the uncoupling inlet 61 and the coupling inlet 62 as in the first embodiment. The mechanical coupler M is uncoupled by a mechanical uncoupling device 5 that may suitably be an uncoupling cylinder as is well known in the art. Also provided are the MRP inlet 11 that is configured to be connected to the main reservoir pipe of the railway vehicle and the UC inlet 12 that is configured to be connected to the uncoupling line of the railway vehicle. The MRP inlet 11 is connected to the MRP valve 71 and the UC inlet 12 is connected to the UC valve 72 such as is well known within the art. In this embodiment, a front chamber of the MRP valve 71 is connected to an MRP inlet 11 provided when the coupler 200 is coupled to a similar coupler. The front chamber of the MRP valve 71 serves to provide pressurized air to the first inlet 201 of the first valve 20 and to the second inlet 302 of the valve unit 30.

Thus, the MRP inlet 11 is connected to the first inlet 201 of the first valve 20, but the second embodiment differs from the first embodiment in that a second inlet 202 of the first valve 20 is connected to the UC inlet 12. Furthermore, the first valve 20 comprises a first outlet 203 that is connected to the second inlet 202 in the second state shown by FIG. 7 and that is connected to the first inlet 201 in the first state shown by FIG. 8. Thus, the second embodiment is similar in being configured to connect the first inlet 201 of the first valve 20 to the first outlet 203 in the first state, but differs from the first embodiment in the second state being a state in which the second inlet 202 is connected to the first outlet 203 to supply air from the UC inlet 12.

The first valve also comprises a trigger 205 that is configured to shift the first valve 20 from the second state to the first state when activated, and the trigger 205 is activated by the uncoupling of the mechanical coupler M, either by being directly caused by the uncoupling motion of the mechanical coupler M or by being caused by a component that is in turn activated by the uncoupling of the mechanical coupler M.

The pneumatic coupler control arrangement 100 also comprises the valve unit 30 that has a first valve unit inlet 301 that is connected to the first outlet 203 of the first valve 20, and that further has a second valve unit inlet 302 that is connected to the MRP inlet 11 through the front chamber of the MRP valve 71 and a third valve unit inlet 303 that is connected directly to the MRP inlet 11. The valve unit 30 also comprises a second valve unit inlet 304 that is connected to the UC inlet 12.

In the valve unit 30, a valve arrangement 40 is provided as will be described in more detail further below. Also provided is a delay device 90 for providing a delayed output of pressurized air to the mechanical uncoupling device 5.

The valve unit 30 comprises a first valve unit outlet 305 that is connected to the uncoupling inlet 61 of the electric coupler control device 6, and also comprises a second valve unit outlet 306 that is connected to the coupling inlet 62. Also, the valve unit 30 comprises a delay connection 307 that may be pneumatic, electric or mechanical and that serves to activate the delay device 90 in response to an activation E1 when the electrical coupler E is in a retracted position. Suitably, the delay connection 307 is activated when the electrical coupler E reaches the retracted position since the completed retraction of the electrical coupler E signifies that the mechanical coupler M may be uncoupled without risking damage to the electrical coupler E.

Furthermore, the pneumatic coupler control arrangement 100 comprises an air shutting device 8 that is in the second embodiment provided between the third valve unit inlet 303 and the MRP inlet 11 to be able to block the flow of air into the third valve unit inlet 303, i.e. to the coupler control inlet A. The air shutting device 8 may be a ball valve 8 and is similar to the air shutting device of the first embodiment.

Operation of the second embodiment will now be described with reference to FIGS. 7 and 8.

In the coupled state of FIG. 7, pressurized air is provided to the MRP inlet 11 and propagates in the pneumatic coupler control arrangement 100 as indicated by arrows along pressurized lines. In the coupled state, air is supplied to the first inlet 201 of the first valve 20 but since the first valve 20 is in the second state there is no supply of air to the first outlet 203 and onwards to the first valve unit inlet 301. The second valve unit inlet 302 and the third valve unit inlet 303 are supplied with air, and due to operation of the valve unit 30 air is suppled from the MRP inlet 11 to the third valve unit inlet 303 and onwards to the second valve unit outlet 306 so that the coupling inlet 62 is active. This maintains the electrical coupler E in the extended position.

When the uncoupling command is received to the UC inlet 12, pressurized air reaches the second inlet 202 of the first valve 20 and since the first valve 20 is in the second state air entering the second inlet 202 is connected to the first outlet 203 and proceeds to the first valve unit inlet 301. In the valve unit 30, this causes the air supplied from the MRP inlet 11 to the uncoupling control inlet A, i.e. to the third valve unit inlet 303 to propagate to the first valve unit outlet 305 so that air is supplied to the uncoupling inlet 61 and the electrical coupler E is retracted. As soon as the electrical coupler E reaches its retracted position, the activation E1 occurs so that the delay device 90 is activated and pressurized air reaches the mechanical uncoupling device 5 and causes the mechanical coupler M to uncouple and reach the position shown in FIG. 8. This also activates the trigger 205 of the first valve 20 so that the first valve 20 is shifted to the first state in which the first inlet 201 is connected to the first outlet 203. The first outlet 203 that has until this point been connected to the second inlet 202 and thereby to the UC inlet 12 is now instead connected to the first inlet 201 and receives pressurized air from the MRP inlet 11. Thus, the activation of the valve unit 30 is maintained so that the electrical coupler E is held in the retracted position. If desired, the ball valve 8 may be used to block air supply to the third valve unit inlet 303 in order to ensure that it is not possible to extend the coupler E accidentally while the rail vehicle is not operational.

For a manual uncoupling command, the uncoupling instead starts with the manual activation device 51 being used to uncouple the mechanical coupler M. This activates the trigger 205 of the first valve 20 so that the first valve 20 is switched to the first state where the first inlet 201 is connected to the first outlet 203 in order to activate the valve unit 30 and connect the third valve unit inlet 303, i.e. the uncoupling control inlet A, to the first valve unit outlet 305 in order to retract the electrical coupler E by activating the uncoupling inlet 61.

The main benefit of the first embodiment as described above is also achieved through the second embodiment, since the activation of the trigger 205 causes the first valve 20 to switch to the first state where pressurized air received to the first inlet 201 from the MRP inlet 11 is connected to the valve unit 30 for activating the valve unit 30 to allow pressurized air to be connected to the first valve unit outlet 305. The main difference in the schematic operation of the first and the second embodiment is that while the first embodiment causes both activation of the valve unit 3 and the supply of pressurized air that is to be connected to the first valve unit outlet 34 through an airflow from the first outlet 23 of the first valve 2, the second embodiment instead uses the airflow from the first outlet 203 to the valve unit 30 only for activating the valve unit 30 itself. The airflow that is connected to the first valve unit outlet 305 is instead provided in the third valve unit inlet 303 that is connected to the MRP inlet 11 without passing through the first valve 20. Thus, the same functions are achieved using the same main components but allowing for differing design and operation inside the valve unit 3, 30. The main benefit remains that the MRP inlet is connected to the valve unit 3, 30 for activating the valve unit 3, 30 and that the MRP inlet is also connected to the valve unit 3, 30 for providing a supply of pressurized air that is to be connected to the first valve unit outlet 305 in order to reach the uncoupling inlet 61 of the electrical coupler control device 6.

The second embodiment will now be described in more detail with reference to FIG. 9-12.

In FIG. 9, the mechanical coupler M and the electrical coupler E are both in the coupled state. In this state, pressurized air is supplied to the MRP inlet 11 but no air is supplied to the UC inlet 12. Thus, the first inlet 201 of the first valve 20 is active and supplied with air but due to the first valve 20 being in the first state, the first inlet 201 is not connected to the first outlet 203. The third valve unit inlet 303 is also supplied with air from the MRP inlet 11 and in the valve unit 30 the third valve unit inlet 303 is connected to a first inlet 401 of a third valve 410 that forms part of the valve arrangement 40 together with a second valve 420.

The third valve 410 comprises a trigger 404 that is connected to the fourth valve unit inlet 304 which is in turn connected to the MRP inlet 11, and the third valve 410 also comprises a first outlet 402 and a second outlet 403. The third valve 410 is shown in FIG. 9 in a first state in which the trigger 404 is activated and air is allowed to pass from the first inlet 401 to the second outlet 403.

Furthermore, the valve arrangement 40 comprises a second valve 420 that has a first inlet 421 connected to the first outlet 402 of the third valve 410, and that also has a second inlet 422 connected to the second outlet 403 of the third valve 410. The second valve 420 further comprises a first outlet 423 that is connected to the first valve unit outlet 305 and also comprises a second outlet 424 that is connected to the second valve unit outlet 306. Also, the second valve 420 comprises a first trigger 425 that is connected to the first valve unit inlet 301.

Also provided in the valve unit 30 is the delay device 90 that comprises a delay device inlet 901 that is connected to the second valve unit inlet 302 and that also comprises a delay device outlet 902 that is connected to the mechanical uncoupling device 5. Also, the delay device 90 comprises the trigger 903 that is triggered by the activation E1 of the electrical coupler E. In the second embodiment, the predetermined delay time is decided by the time it takes the electrical coupler E to retract, since it is the electrical coupler E reaching the retracted state that causes activation of the delay device 90 so that air provided from the UC inlet 12 via the second valve unit inlet 302 to the delay device inlet 901 may pass to the delay device outlet 902 and thus activate the mechanical uncoupling device 5.

Valves that are to be returned to a given state when not activated by a trigger are suitably arranged with a spring that serves to urge the valve back into the untriggered state. This is well known within the art and will not be described in more detail.

Uncoupling of the electrical coupler E and the mechanical coupler M will now be described in more detail with reference to FIG. 9-11 and the manual uncoupling sequence will also be described with reference to FIG. 12.

An uncoupling command is as in the first embodiment received by the UC inlet 12 receiving pressurized air from the railway vehicle. This provides air to the second inlet 202 of the first valve 20 and since the first valve 20 is in the second state this is propagated to the first outlet 203 and on to the first valve unit inlet 301 so that the first trigger 425 of the second valve 420 is activated. Activation of the second valve 420 shifts the second valve 420 from a second state to a first state.

The second state of the second valve 420 is a state in which the second inlet 422 is connected to the second outlet 424 and thus to the second valve unit outlet 306 in order to provide air to the coupling inlet 62 so that the electrical coupler is extended. The first state of the second valve 420 is a state in which the second inlet 422 is instead connected to the first outlet 423 so that air is supplied to the first valve unit outlet 305 and to the uncoupling inlet 61 in order to retract the electrical coupler E.

Thus, when the uncoupling command is received by the pneumatic coupler control arrangement 100, this activates the second valve 420 and switches it into the first state so that the electrical coupler E is retracted. The uncoupling command also provides air to the second valve unit inlet 302 that reaches the delay device inlet 901, but since the delay device 90 is not active the delay device inlet 901 is not yet connected to the delay device outlet 902. FIG. 10 shows this state.

Once the electrical coupler E reaches its retracted position, the activation E1 causes the delay device 90 to be triggered so that the delay device inlet 901 is connected to the delay device outlet 902 in order to activate the mechanical uncoupling device 5 and uncouple the mechanical coupler M. This also causes the trigger 205 of the first valve 20 to be triggered so that the first valve 20 is switched to the first state in which the first inlet 201 is connected to the first outlet 203. This provides air from the MRP inlet 11 to the first outlet 203 so that the triggering of the second valve 420 is maintained and the electrical coupler E is held in the retracted position.

In FIG. 11, both the mechanical coupler M and the electrical coupler E are uncoupled. This means that the front chamber of the MRP valve 71 is no longer connected to the MRP inlet 11 and that air supply to the first inlet 201 of the first valve 20 and to the fourth inlet 304 to the valve unit 30 is interrupted. Thereby, the third valve 410 is switched to a state where the inlet 401 is connected to the second outlet 402 and the second valve 420 is switched to its second state in which the first inlet 421 is connected to the first outlet 423. As a result, pressurized air provided from the MRP inlet 11 to the third valve unit inlet 303 is supplied to the first valve unit outlet 305 so that the electrical coupler E is held in its retracted position. Accidental extension of the electrical coupler E is thereby prevented, and if desired the ball valve 8 may also be shut to prevent the flow of pressurized air to the electrical coupler control device 6 altogether.

Similar to the first embodiment, the second embodiment may suitably comprise filters 104, 105, 106.

FIG. 12 discloses a manual uncoupling sequence of the second embodiment, starting with manual uncoupling of the mechanical coupler M. This triggers the first valve 20 so that the first inlet 201 is connected to the first outlet 203 in order to supply air to the first valve unit inlet 301 and trigger the second valve 420. By thus connecting the second inlet 422 of the second valve 420, that receives pressurized air from the third valve unit inlet 303 via the third valve 410, to the first outlet 423 of the second valve 420 the first valve unit outlet 305 is pressurized and the electrical coupler E is retracted due to the uncoupling inlet 61 being pressurized. As the electrical coupler E reaches its retracted position, the delay device 90 is triggered but this does not provide air to the mechanical uncoupling device 5 since the UC inlet 12 does not provide pressurized air to the delay inlet 901.

It is to be noted that the valve unit 3, 30 may be provided as one component that comprises the components described herein as forming part of the valve unit 3, 30, but it is also possible that the valve unit 3, 30 can be provided as a plurality of components that are connected to each other in the ways described herein.

It is also to be noted that features from the various embodiments described herein may freely be combined, unless it is explicitly stated that such a combination would be unsuitable.

The invention claimed is:

1. A method for uncoupling a coupler of a railway vehicle, the coupler comprising a mechanical coupler and an electrical coupler, the method comprising uncoupling a mechanical coupler (M) in response to an uncoupling command, activating a first valve (2, 20) in response to the uncoupling of the mechanical coupler (M) by switching the first valve (2, 20) from a second state to a first state, the first valve (2, 20) comprising a first inlet (21, 201) connected to an MRP inlet (11) configured to be connected to a main reservoir pipe of a rail vehicle, wherein the first state of the first valve (2, 20) is a position in which the first inlet (21, 201) is connected to a first outlet (23, 203) so that air is able to flow through the first valve (2, 20) to the first outlet (23, 203), activating a valve unit (3, 30) by receiving air from the first outlet (23, 203) of the first valve (2, 20) to a first valve unit inlet (31, 301), and switching a second valve (4, 420) of the valve unit (3, 30) to a first state, said first state being a position in which the uncoupling control inlet (A) is connected to the first valve unit outlet (34, 305), connecting an uncoupling control inlet (A) of the valve unit (3, 30) to a first valve unit outlet (34, 305) in response to the activation of the valve unit (3, 30), said uncoupling control inlet (A) being an inlet supplied by air from the MRP inlet (11), deactivating an electrical coupler control device (6) by receiving air from the first valve unit outlet (34, 305) to an uncoupling inlet (61) of the electrical coupler control device (6), and retracting the electrical coupler (E).

2. A method according to claim 1, further comprising blocking air supply from the main reservoir pipe of the rail vehicle to the uncoupling control inlet (A) after the electrical coupler (E) is uncoupled.

3. A method according to claim 1, wherein the first valve (2) is activated by the uncoupling of the mechanical coupler (M).

4. A method according to claim 1, wherein the uncoupling command is a manual activation of a manual activation device (51) for the mechanical coupler (M).

5. A method according to claim 1, wherein the uncoupling control inlet (A) is the first valve unit inlet (31).

6. A method according to claim 5, further comprising receiving air to the valve unit (3) from a second outlet (24) of the first valve (2), said first valve (2) being in a second state in which the first inlet (21) is connected to the second outlet (24) of the first valve (2), activating the valve unit (3) by receiving the uncoupling command to a third valve unit inlet (33), wherein the uncoupling command is a supply of air to a UC inlet (12), said UC inlet configured to be connected to an uncoupling pipe of the rail vehicle, activating the valve unit (3) comprises switching the second valve (4) to a second state, said second state being a position in which a second valve unit inlet (32) is connected to the first valve unit outlet (34), said second valve unit inlet (32) is connected to the second outlet (24) of the first valve (2), and the first valve unit outlet (34) is connected to the uncoupling inlet (61) of the electrical coupler control device (6) for uncoupling the electrical coupler, and providing a delayed uncoupling of the mechanical coupler (M) by the supply of air to the third valve unit inlet (33) being fed to the mechanical coupler (M) after a predetermined delay time, wherein the activation of the valve unit (3) by receiving the uncoupling command and the providing of the delayed uncoupling of the mechanical coupler take place before the uncoupling of the mechanical coupler.

7. A method according to claim 1, wherein the uncoupling control inlet is a third valve unit inlet (303).

8. A method according to claim 7, wherein the uncoupling command is a supply of air to a UC inlet (12), said UC inlet being configured to be connected to an uncoupling pipe of the rail vehicle, and further comprising providing a delayed uncoupling of the mechanical coupler (M) by a supply of air from the UC inlet (12) to a second valve unit inlet (302) being fed to a manual activation device (51) for the mechanical coupler (M) after a predetermined delay time.

9. A method according to claim 8, wherein the predetermined delay time is a time until the electrical coupler (E) is in a retracted position.

10. A pneumatic coupler control arrangement for controlling an uncoupling of a coupler for a rail vehicle, the coupler having a mechanical coupler and an electrical coupler, the pneumatic coupler control arrangement comprising a mechanical uncoupling device (5) for uncoupling a mechanical coupler, a first valve (2, 20) comprising a first inlet (21, 201) connected to an MRP inlet (11) configured to be connected to a main reservoir pipe of a rail vehicle for receiving pressurized air, the first valve (2, 20) further comprising a first outlet (23, 203) and a trigger (25, 205) for switching the first valve (2, 20) to a first state, wherein the first state is a position in which the first inlet (21, 201) is connected to the first outlet (23, 203), and the mechanical uncoupling device (5) is configured to activate the trigger (25, 205) in response to an uncoupling command, a valve unit (3, 30) comprising a first valve unit inlet (31, 301) operatively connected to the first outlet (23, 203) of the first valve (2, 20), wherein the valve unit (3, 30) comprises a first trigger (T1, 425) connected to the first valve unit inlet (31, 301) for activating the valve unit (3, 30) to switch a second valve (4, 420) of the valve unit (3, 30) to a first state, and the first state is a state in which an uncoupling control inlet (A) is connected to a first valve unit outlet (34, 305), said uncoupling control inlet (A) being an inlet supplied by air from the MRP inlet (11), and an electrical coupler control device (6) configured to extend an electrical coupler for coupling and retract the electrical coupler for uncoupling, wherein the electrical coupler control device (6) comprises an uncoupling inlet (61), said uncoupling inlet (61) connected to the first valve unit outlet (34, 305) and the electrical coupler control device (6) configured to uncouple an electrical coupler in response to receiving pressurized air to the uncoupling inlet (61).

11. A pneumatic coupler control arrangement according to claim 10, further comprising an air shutting device (8) configured to block a supply of pressurized air to the uncoupling control inlet (A).

12. A pneumatic coupler control arrangement according to claim 10, wherein the mechanical coupler uncoupling device (5) is configured to activate the trigger (25, 205) of the first valve (2, 20) in connection with the uncoupling of the mechanical coupler (M).

13. A pneumatic coupler control arrangement according to claim 10, further comprising a manual activation device (51) for activating the mechanical coupler uncoupling device (5).

14. A pneumatic coupler control arrangement according to claim 10, wherein the coupler control inlet (A) is the first valve unit inlet (31).

15. A pneumatic coupler control arrangement according to claim 14, wherein the first valve (2) is a five-way two positional mechanical control valve.

16. A pneumatic coupler control arrangement according to claim 14, wherein the first valve (2) comprises a second outlet (24), the first inlet (21) is connected to the second outlet (24) in a second state of the first valve (2), and the second outlet (24) further being connected to a second valve unit inlet (32), and the valve unit (3) comprises a third valve unit inlet (33) connected to a UC inlet (12) configured to be connected to an uncoupling pipe of the rail vehicle for receiving pressurized air, a second trigger (T2) connected to the third valve unit inlet (33) for switching the second valve (4) to a second state, said second state being a state in which the second valve unit inlet (32) is connected to the first valve unit outlet (34), and a delay device (9) having an inlet (93) connected to the third valve unit inlet (33) and comprising an outlet (95) connected to the mechanical uncoupling device (5) for uncoupling the mechanical coupler, the delay device (9) being configured to connect the inlet (93) to the outlet (95) with a predetermined delay.

17. A pneumatic coupler control arrangement according to claim 16, wherein the delay device comprises an air container and/or a flow regulator valve.

18. A pneumatic coupler control arrangement according to claim 10, wherein the coupler control inlet (A) is a third valve unit inlet (303).

19. A pneumatic coupler control arrangement according to claim 18, wherein the valve unit (30) comprises a delay device (90) having a delay device inlet (901) connected to the second valve unit inlet (302) and a delay device outlet (902) connected to the mechanical uncoupling device (5) for uncoupling the mechanical coupler, and the delay device (90) configured to connect the delay device inlet (901) to the delay device outlet (902) with a predetermined delay, said connecting of the delay device inlet (901) to the delay device outlet (902) being triggered by the electrical coupler (E) reaching a retracted position.

* * * * *